(12) United States Patent  
Loperfido

(10) Patent No.: US 9,382,743 B2
(45) Date of Patent: Jul. 5, 2016

(54) DEVICE FOR MOVING MEMBERS FOR OPERATING OR FOR CLOSING A WINDOW OR DOOR FRAME

(71) Applicant: MASTERLAB S.r.l. UNIPERSONALE, Conversano (IT)

(72) Inventor: Michele Loperfido, Castellana Grotte (IT)

(73) Assignee: MASTERLAB S.R.L. UNIPERSONALE, Conversano (BA) (IT)

( * ) Notice: Subject to any disclaimer, the term of this patent is extended or adjusted under 35 U.S.C. 154(b) by 0 days.

(21) Appl. No.: 14/610,485

(22) Filed: Jan. 30, 2015

(65) Prior Publication Data
US 2015/0211280 A1    Jul. 30, 2015

(30) Foreign Application Priority Data

Jan. 30, 2014  (IT) .............................. MI2014A0128
Jan. 30, 2014  (IT) .............................. MI2014A0129

(51) Int. Cl.
*E05F 11/14*  (2006.01)
*F16H 57/031*  (2012.01)
(Continued)

(52) U.S. Cl.
CPC . *E05F 11/14* (2013.01); *E05B 9/02* (2013.01); *E05B 63/06* (2013.01); *F16H 57/031* (2013.01);
(Continued)

(58) Field of Classification Search
CPC ............ E05B 63/06; E05B 9/02; E05F 11/14; F16H 57/031

USPC ........ 292/32, 33, 39, 160, 137, 138, 172, 142
See application file for complete search history.

(56) References Cited

U.S. PATENT DOCUMENTS 6,810,699 B2 * 11/2004  Nagy .................. E05B 15/0086
                                                      292/341.15
6,971,686 B2 * 12/2005  Becken .................. E05B 63/20
                                                      292/142

(Continued)

FOREIGN PATENT DOCUMENTS

DE          3293       3/1878
DE        410964       3/1925
(Continued)

OTHER PUBLICATIONS

Italian Search Report issued in corresponding Italian Patent Application No. MI2014A000128, filed Jan. 30, 2014.

(Continued)

*Primary Examiner* — Katherine Mitchell
*Assistant Examiner* — Marcus Menezes
(74) *Attorney, Agent, or Firm* — Lucas & Mercanti, LLP.

(57) ABSTRACT

Device for moving operating or closing members of a window or door frame movable swing, the device being activated by rotation of a handle pin and comprising a body containing a mechanism transforming the rotation of an element coupled with the pin in translation of a slider coupled with an operating or closing rod, said body being housed in a seat of movable swing side profile, an auxiliary body movably mounted on the body along a direction parallel to the movable swing side and orthogonal to the slider translation direction, the auxiliary body having an abutment with a profile plane serving as reference for positioning the body in the seat, one threaded stem, extending parallel to said auxiliary body movement direction, being inserted in an auxiliary body through-hole and engaging in a body threaded hole, and a spring mounted on the stem between the auxiliary body and the body.

13 Claims, 13 Drawing Sheets

(51) Int. Cl.
*E05B 63/06* (2006.01)
*E05B 9/02* (2006.01)
*E05C 9/04* (2006.01)

(52) U.S. Cl.
CPC .............. *E05C 9/041* (2013.01); *E05C 9/042* (2013.01); *Y10T 74/18568* (2015.01); *Y10T 74/18808* (2015.01); *Y10T 74/2186* (2015.01)

(56) References Cited

U.S. PATENT DOCUMENTS

| | | | |
|---|---|---|---|
| 7,178,839 B2 * | 2/2007 | Tsai | E05B 65/0858 292/112 |
| 7,878,034 B2 * | 2/2011 | Alber | E05C 7/06 292/142 |
| 8,118,334 B2 * | 2/2012 | Ramsauer | E05C 3/042 292/194 |
| 8,702,131 B1 * | 4/2014 | Gianoli | E05B 63/0056 292/1.5 |
| 2005/0166647 A1 * | 8/2005 | Walls | E05C 9/20 70/107 |
| 2013/0234449 A1 * | 9/2013 | Dery | E05C 7/04 292/162 |

FOREIGN PATENT DOCUMENTS

| | | | |
|---|---|---|---|
| DE | 590273 | 12/1933 | |
| EP | 0598927 | 6/1994 | |
| EP | 2317046 | 5/2011 | |
| EP | 2586940 | 5/2013 | |
| FR | EP 2586940 A1 * | 5/2013 | .......... E05B 63/0056 |
| GB | 22750 | 0/1910 | |
| GB | 2475507 | 5/2011 | |

OTHER PUBLICATIONS

Italian Search Report issued in corresponding Italian Patent Application No. MI2014A000129, filed Jan. 30, 2014.
Machine-Generated English translation of EP 2 586 940 A1, which is available on EPO website, printed on Feb. 18, 2016 (14 pages).

* cited by examiner

DEVICE FOR MOVING MEMBERS FOR OPERATING OR FOR CLOSING A WINDOW OR DOOR FRAME

CROSS-REFERENCE TO RELATED APPLICATIONS

The present application claims the priority of Italian Patent Application Nos. MI2014A000128, filed Jan. 30, 2014 and MI2014A000129, Filed Jan. 30, 2014, the contents of which are incorporated herein by reference.

FIELD OF THE INVENTION

The present invention refers to a device for moving members for operating or for closing a window or door frame. More specifically, the present invention refers to a device for moving members for operating or closing a window or door frame and of the type activated by the rotation of the pin of a control lever or handle ("square pin").

BACKGROUND OF THE INVENTION

In the field of window or door frames and casings it is known to use handles that are applied to the profile that forms the side of the moveable swings opposite that at which the articulation hinges of the movable swing itself are fixed and the rotation of which handles activates, by means of a suitable moving device housed inside such a same profile, the sliding of one or more vertical rods also housed in the same profile.

These vertical rods, in turn, can activate or form closing members for closing the window or door frame.

The moving device—which, in the jargon is called "macchinetta" ("one or two way mechanism")—supports and contains a rotary element provided with a coupling seat for coupling with the lever or handle pin and a mechanism that allows the rotary motion of such a rotary element to be transformed into translational motion of one or two sliders in turn coupleable with a respective said vertical rod.

As the type of window or door frame changes—internal opening, i.e. towards the inside of a room like, for example, the windows, or external opening, i.e. towards the outside of a room, like, for example, the louvre windows—both the type of the profiles that form the movable swing and the position of the control lever or handle pin change.

In particular, the distance between the axis of the pin of the control lever or handle and the external part of the profile on which it is applied changes; in the jargon, such a distance is indicated as "entrata della martellina" (i.e. "handle entry") or "ingresso della martellina" (i.e. "handle inlet") where "martellina" indicates the lever or handle pin.

In general, such a distance is of a limited size that takes into account both the width of the profile and the bulk of the lever or handle, which lever or handle, in particular for external opening windows and doors, must not strike against the other swing or the fixed frame of the window or door frame.

There are no reference standards for such a distance and each manufacturer has adopted its own, establishing, for each type of profile and window or door frames, set values of such a distance ("ingresso martellina" i.e. "handle inlet").

Typically, such a distance is equal to 10 mm or 15 mm for internal opening window or door frames and to 30 mm or 35 mm for external opening window or door frames.

To each of such values corresponds a respective moving device or "macchinetta".

Indeed, as the entry position of the lever or handle pin changes, the size of such a moving device or, at least, the position of the rotary element that is intended to couple with the lever or handle pin changes.

Every manufacturer, therefore, has, in general, a series of different moving devices ("macchinette"): one for each "entry" value of the lever or handle pin, with clear drawbacks in terms of design, production and storage management.

Moreover, at the mounting stage it is necessary to obtain a series of through-holes on the face of the profile on which the lever or handle is to be applied and at the seat inside which the moving device is housed. One of such holes is provided for the passage of the lever or handle pin and the others for the passage of fixing members of the same moving device ("macchinetta").

If errors occur in making such holes, which do not allow the moving device to be aligned with the holes, i.e. the seat of the rotary element intended to couple with the lever or handle pin and the holes intended to be engaged by the fixing members, the profile needs to be discarded and the perforation operations need to be repeated on a new profile. This involves obvious drawbacks in terms of material and machining costs.

In known moving devices ("macchinette"), moreover, the rotary element consists of a reel that meshes one or two racks that face one another, extend in a direction parallel to or coinciding with the direction of translation of the slider(s) and each of which is fixed or in any case obtained in a respective slider.

Known moving devices ("macchinette"), as already stated above, are encased in seats obtained in the profile that forms the side of the frame of the movable swing of a window or door frame; this sets limitations to the overall bulk of such moving devices. In particular, the transversal size of such moving devices, i.e. the dimension thereof extending in a direction parallel to the plane of the movable swing and orthogonal to the direction of translation of the sliders and to the rotation axis of the reel, is contained within predetermined limits set by the shape and size of the seat of the profile in which the same moving device is housed.

For this reason, the reel has a limited diameter, which reflects in a low height of its teeth and which is even more marked in the case in which it must mesh with two instead of just one rack.

The conjugated surfaces of the teeth of the reel with the teeth of the rack or racks are, therefore, extremely reduced and the forces exerted by the users on the control lever or handle act on them.

Often, therefore, such teeth break, causing "jumping" and irregular operation of the moving devices and often requiring their total replacement.

All of this is aggravated by the fact that, in general, reel and racks are made of metal alloys with reduced characteristics of mechanical strength, such as zinc alloys (zama).

SUMMARY OF THE INVENTION

The purpose of the present invention is to overcome the drawbacks of the prior art.

In such a general purpose, a purpose of the present invention is to provide a device for moving members for operating or closing a window or door frame of the type activated by the rotation of the pin of a control lever or handle that is versatile and adaptable to the different types of window or door frames and profile and to the different mounting needs of the control lever or handle, in particular, to the different values that can be taken by the distance between the axis of the pin of a lever or handle and the external part of the profile that forms the side of the frame ("entry" or "inlet").

Another purpose of the present invention is to provide a device for moving members for operating or closing a window or door frame of the type activated by the rotation of the pin of a control lever or handle that permits to simplify the mounting operations on profiles, reducing the time required to carry them out and reducing the wastage due to operating errors.

Yet, another purpose of the present invention is to provide a device for moving members for operating or closing a window or door frame of the type activated by the rotation of the pin of a control lever or handle that permits to ensure regular and fluid motion of the moving members and that permits to reduce the risks of the moving members breaking.

Another purpose of the present invention is to make a device for moving members for operating or closing a window or door frame of the type activated by the rotation of the pin of a control lever or handle that is particularly simple and functional, with low costs.

These purposes according to the present invention are accomplished by making a device for moving members for operating or closing a window or door frame of the type activated by the rotation of the pin of a control lever or handle as outlined in claim 1.

Further characteristics are provided in the dependent claims.

The characteristics and advantages of a device for moving members for operating or closing a window or door frame of the type activated by the rotation of the pin of a control lever or handle according to the present invention will become clearer from the following description, given as an example and not for limiting purposes, referring to the attached schematic drawings:

DETAILED DESCRIPTION OF THE INVENTION

Figure 1:
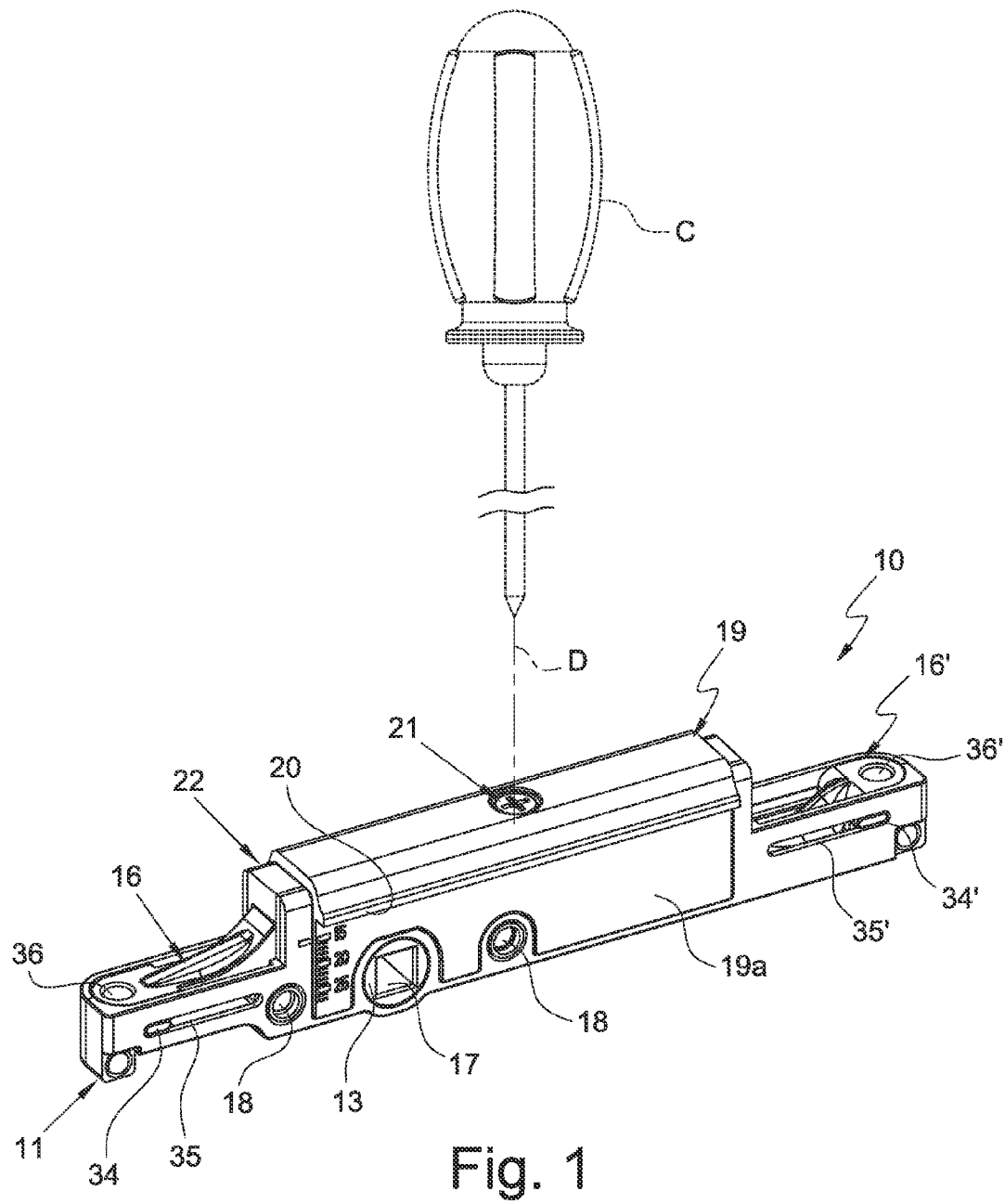
FIG. 1 is a schematic axonometric view of a moving device according to the present invention with the auxiliary body and the supporting and containing body in a first relative limit position.
Figure 2:
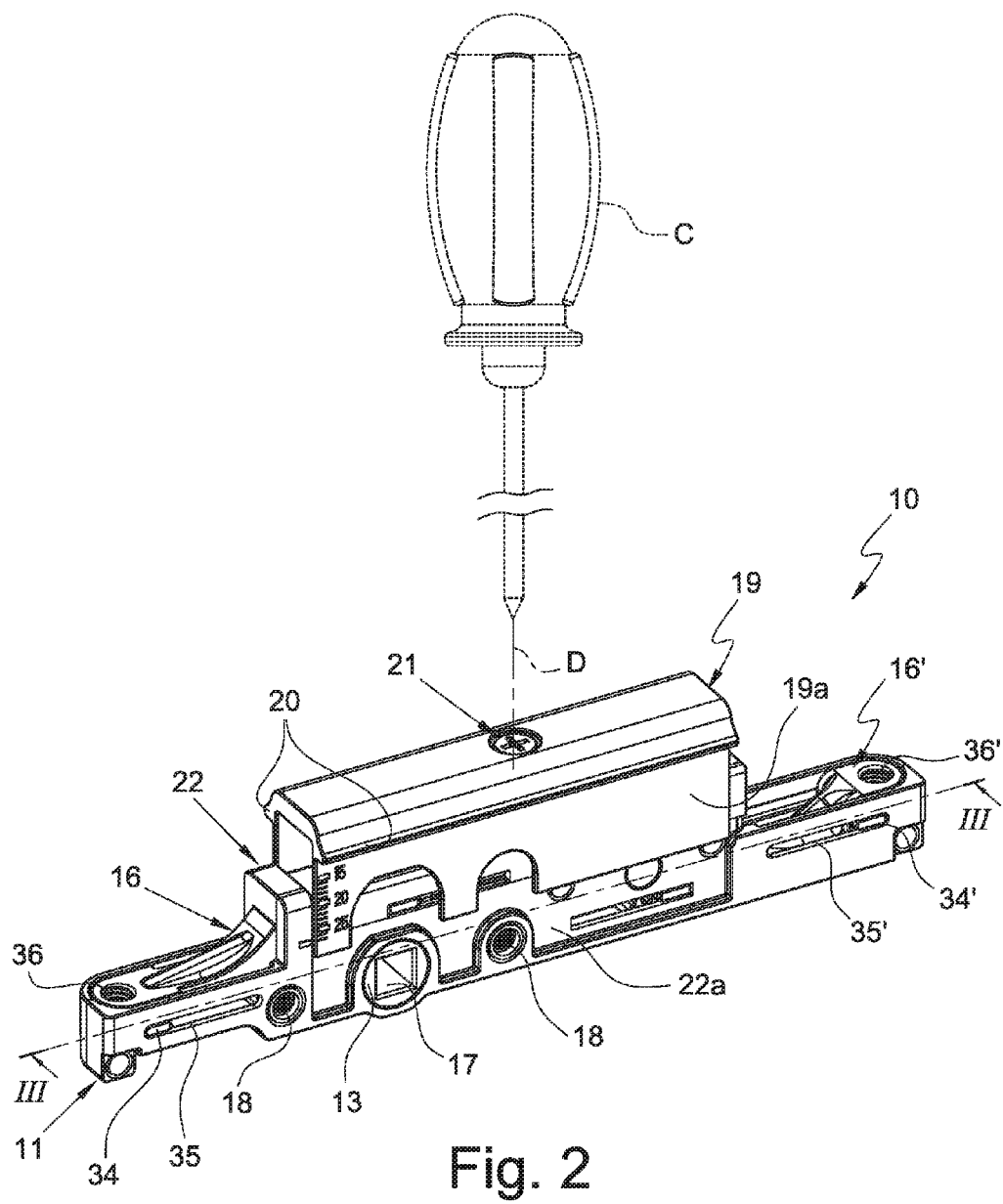
FIG. 2 is a schematic axonometric view of the moving device of FIG. 1 with the auxiliary body and the supporting and containing body in a second relative limit position.

With reference to the attached figures, a device for moving members for operating or closing a window or door frame, of the type activated by the rotation of the pin of a lever or handle, has been wholly indicated with 10.

The moving device 10 comprises a supporting and containing body 11 that supports and contains a mechanism 12 for transforming the rotary motion of an element 13, which is intended to be coupled with the pin 14 of a control lever or handle 15 from which it receives the rotary motion, into translational motion of at least one slider 16 along the two opposite senses of the same line R.

The supporting and containing body 11 is houseable in a seat 101, 201, 301 of a profile 100, 200, 300 constituting a side of a window or door frame movable swing.

The at least one slider 16 is coupleable with a respective rod for operating or closing the window or door frame movable swing, which rod is housed in a chamber of the same profile 100, 200, 300. In the attached figures the movable swing and the operating or closing rods are not represented since they are of the type known to the person skilled in the art.

The profile 100, 200, 300 is not part of the present invention and the embodiments thereof represented in the attached figures are provided just as non-limiting examples.

As far as what relates the present invention, the profile 100, 200, 300 defines, by itself or assembled to another profile, a side of a window or door frame movable swing and, in particular, the side opposite that at which the hinges that articulate the same movable swing to the fixed frame of the window or door frame are fixed.

The profile 100, 200, 300 has two substantially planar faces, 100a and 100b, 200a and 200b, 300a and 300b respectively, which are spaced apart from each other and parallel to the plane defined by the movable swing and generically indicated by the trace line P.

The control lever or handle 15 is applied onto one of such two faces—on the face 100a, 200a and 300a, respectively. For this purpose, a series of through-holes, 102, 202 and 302 respectively, are obtained on such a face, which communicate with the seat 101, 201 and 301 and one of which is intended for the passage of the pin 14 of the lever or handle 15, which pin engages in a corresponding seat 17 obtained in the element 13, and the remaining ones are intended for the passage of threaded elements that engage in corresponding holes 18 obtained in the supporting and containing body 11 for fixing the latter to the profile 100, 200, 300 and not represented in the attached figures, being of the type known to the person skilled in the art.

The same face on which the lever or handle 15 is applied or the opposite one it has a wing 103, 203, 303 that covers, in an abutting manner, the profile 104, 204, 304 of the fixed frame or of the other swing of the same window or door frame when it is closed.

Figure 5:
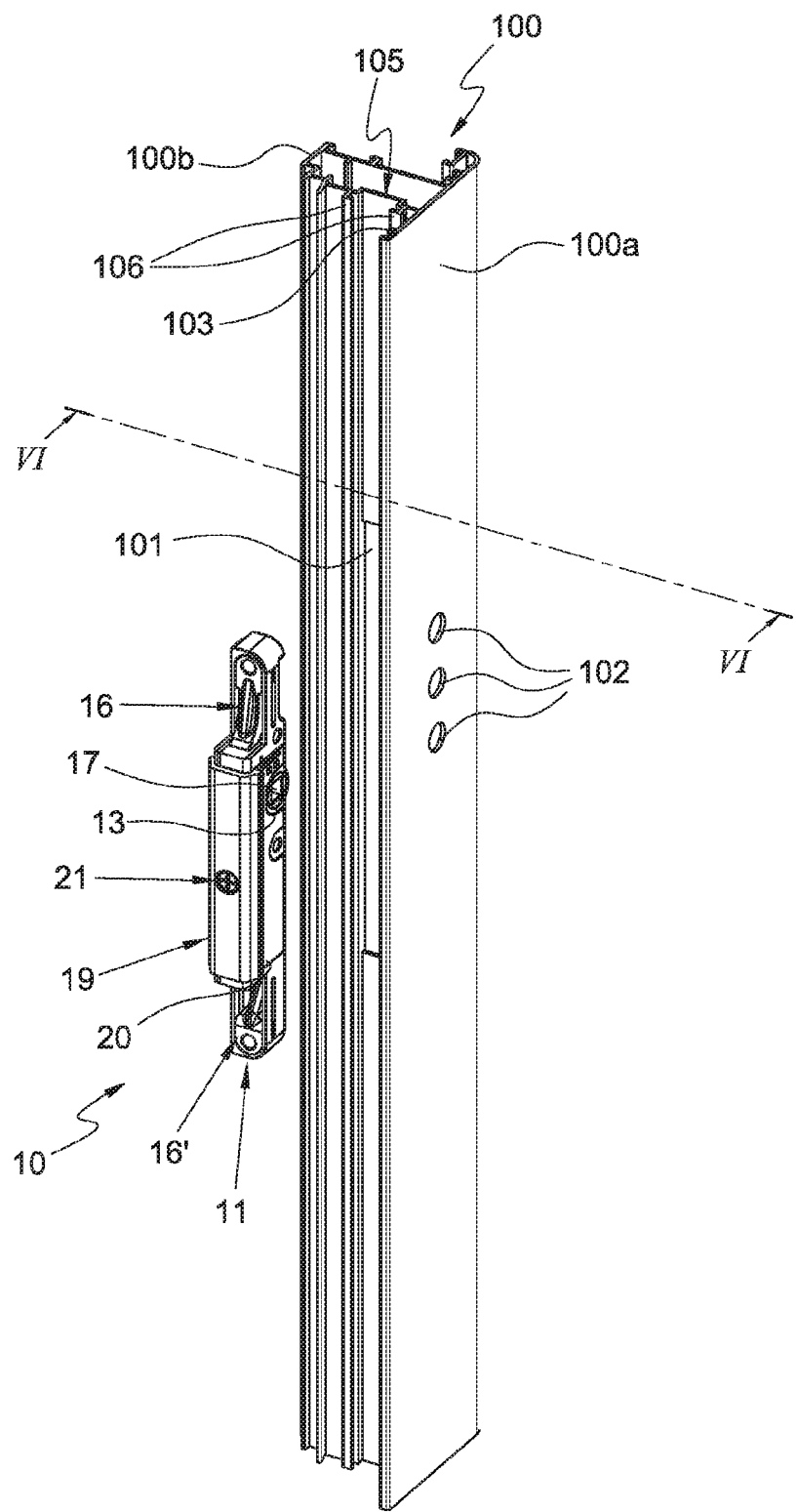
FIG. 5 shows the moving device of FIG. 1 in the step of mounting on a profile that forms the side of an internal opening window or door frame movable swing.
Figure 6:
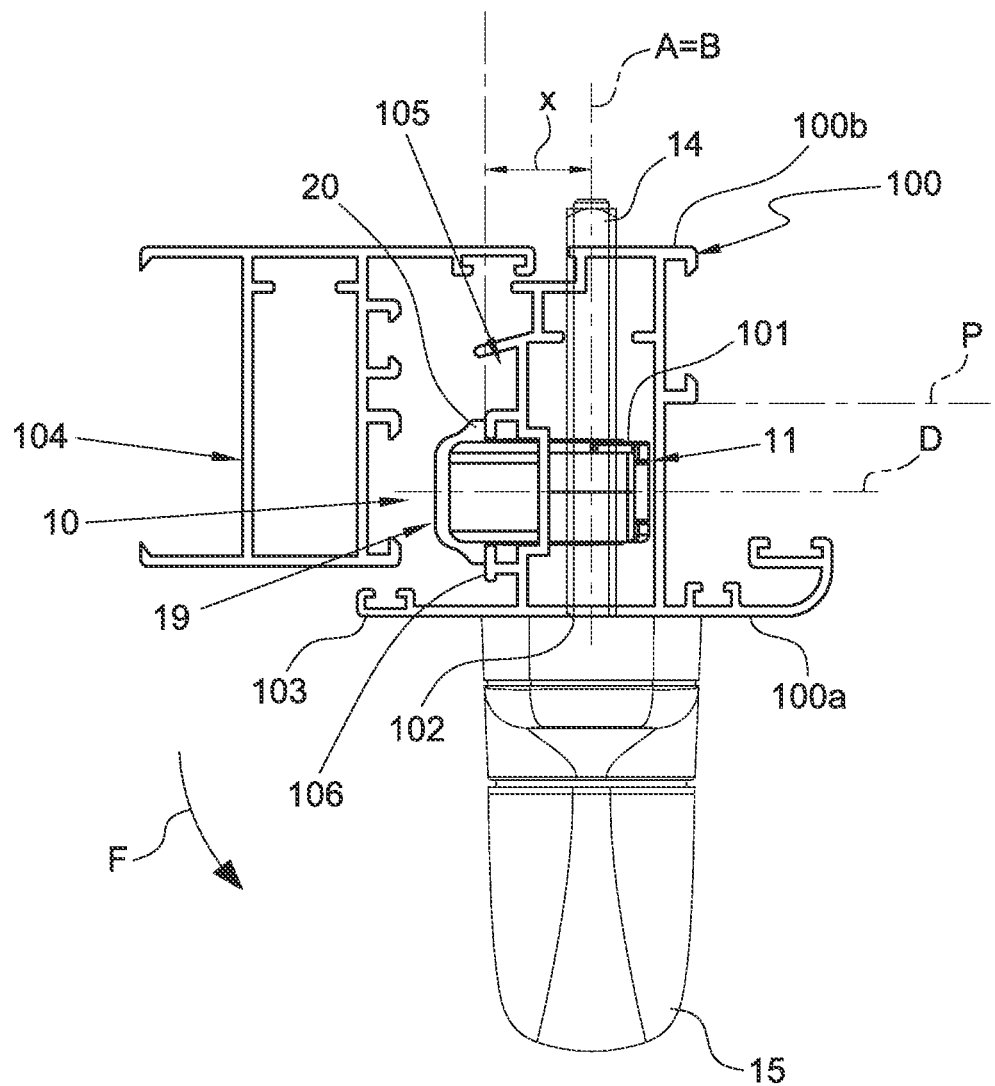
FIG. 6 is a schematic cross section view of the profile of FIG. 5 taken along line VI-VI with the moving device of FIG. 1 applied and in abutment position on the profile that forms the corresponding side of the fixed frame or of the other swing of the window or door frame.
Figure 7:
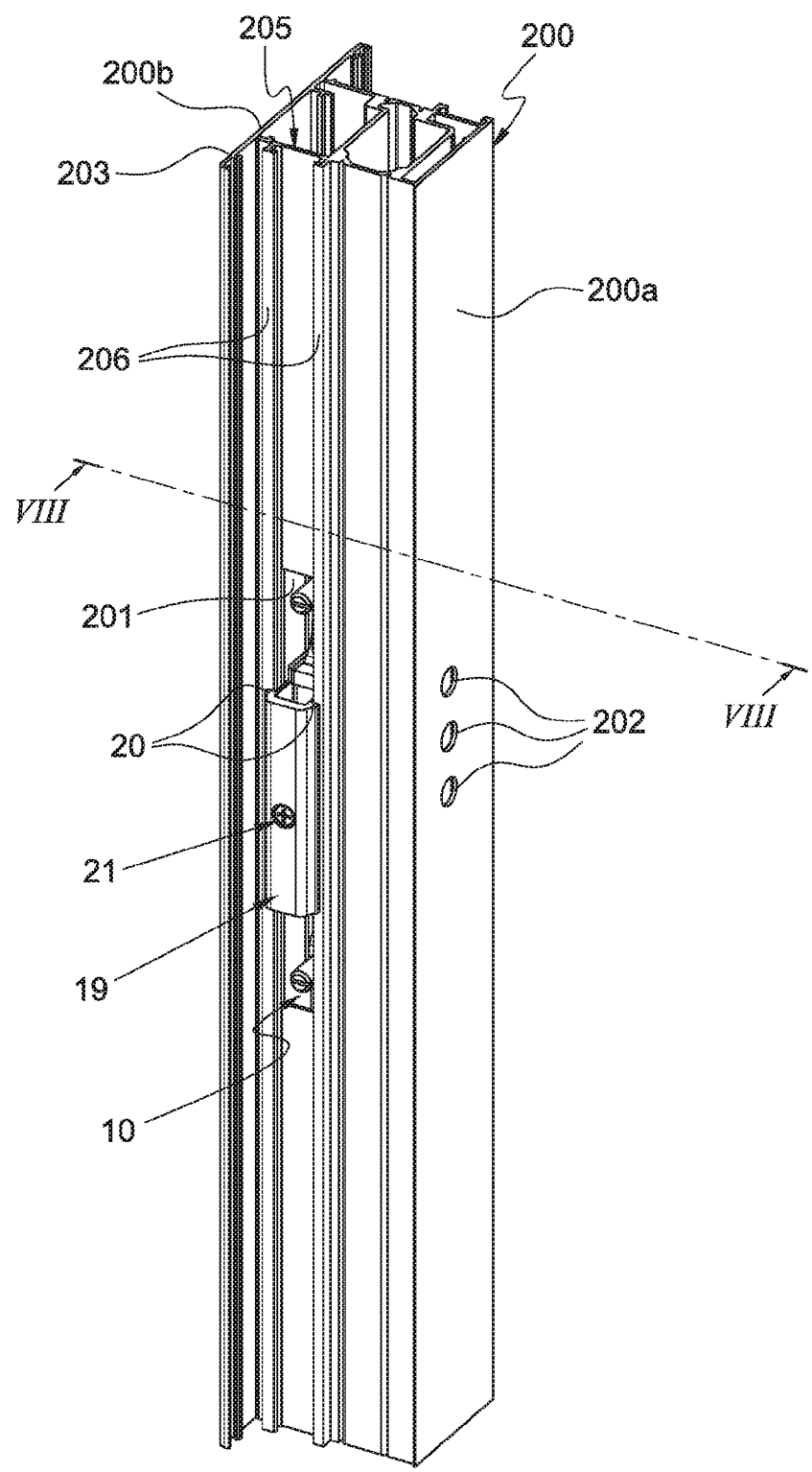
FIG. 7 shows a moving device like the one of FIG. 1 mounted on the profile that forms the side of an external opening window or door frame movable swing.
Figure 8:
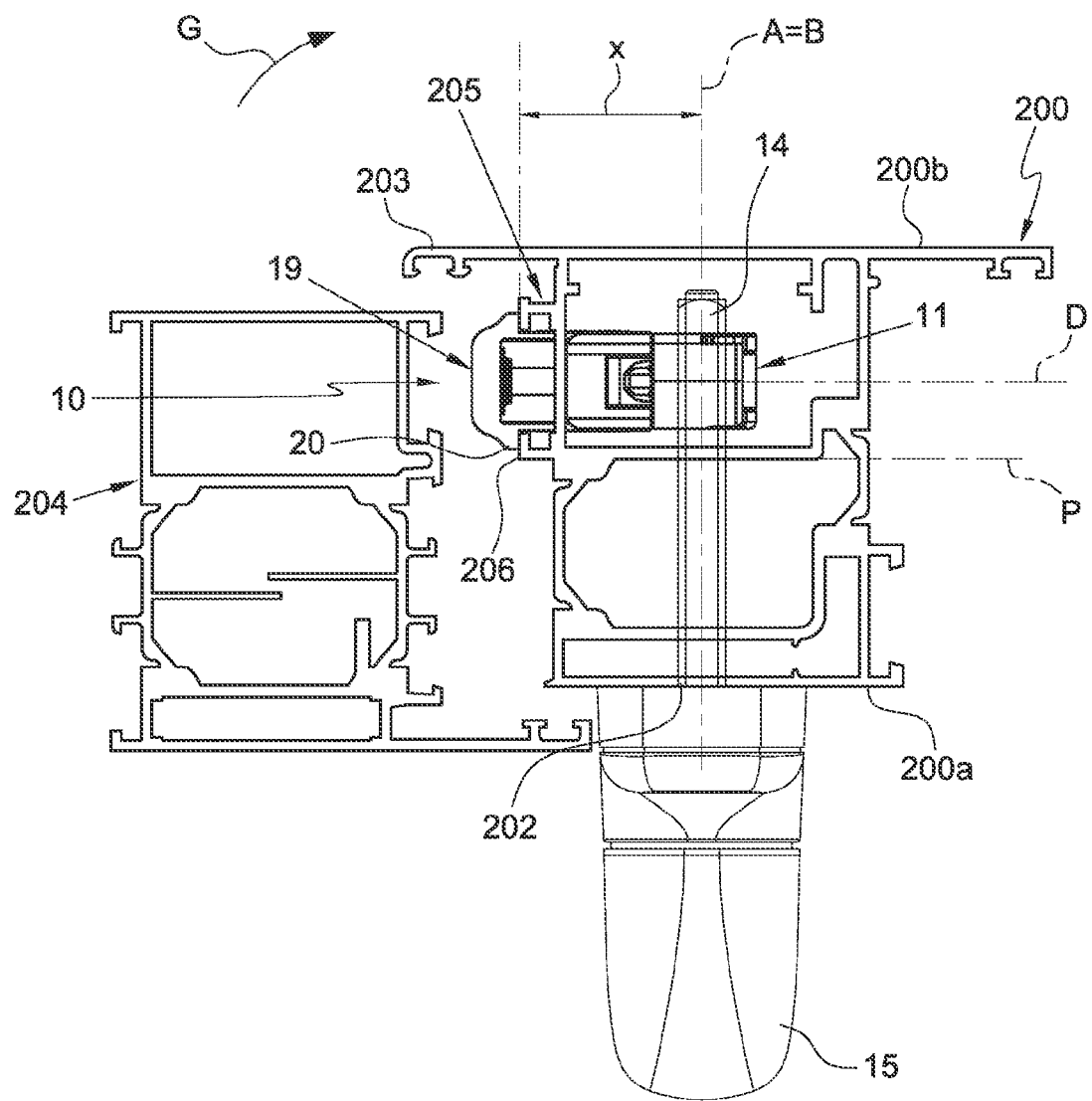
FIG. 8 is a schematic cross section view of the profile of FIG. 7 taken along line VIII-VIII with the moving device applied and in an abutment position on the profile that forms the corresponding side of the fixed frame or of the other swing of the window or door frame.
Figure 9:
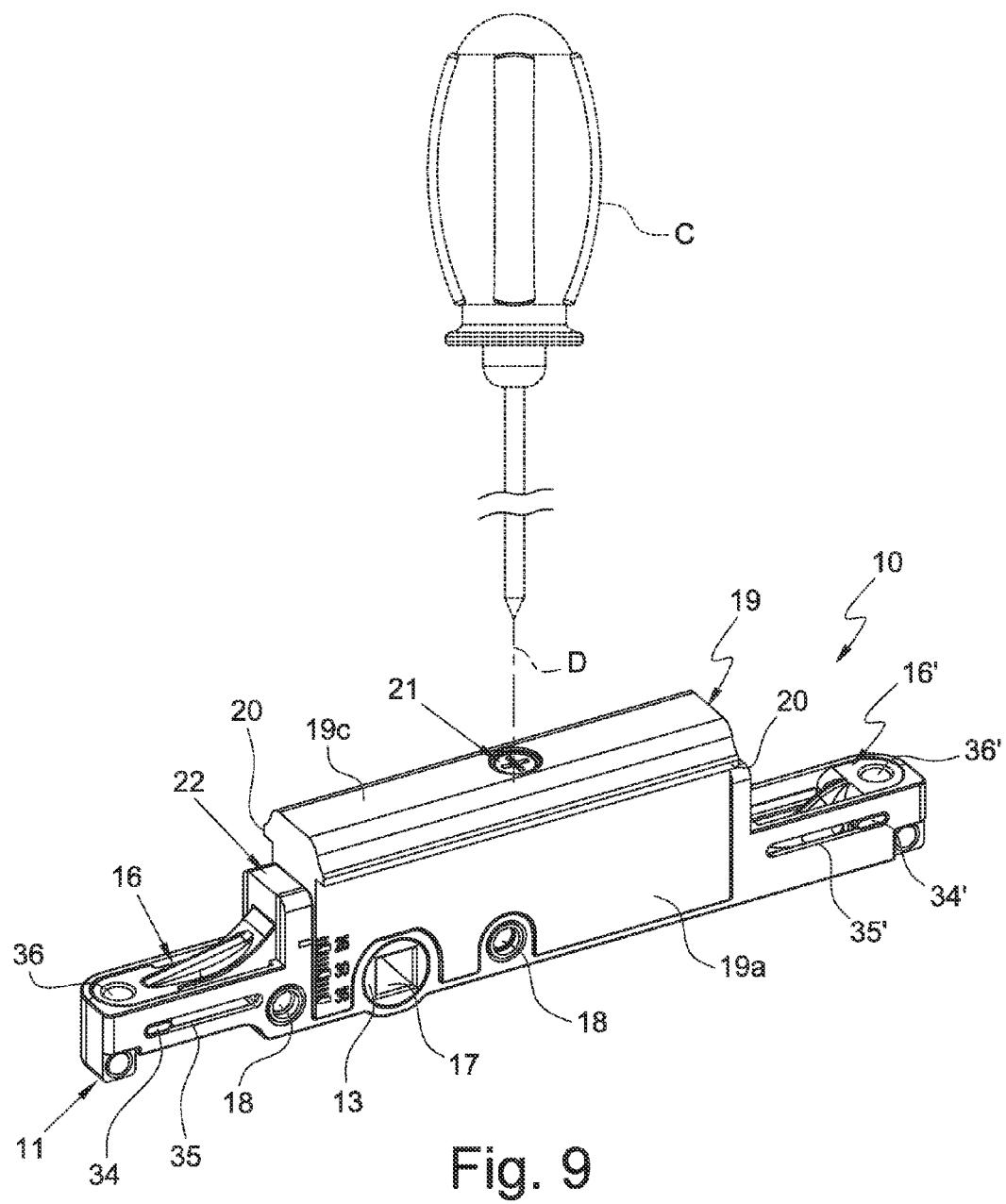
FIGS. 9, 10 and 11 are views like those of FIGS. 1, 2 and 3 in which on the supporting and containing body an auxiliary body is mounted that has a greater height than that represented in FIGS. 1, 2 and 3.
Figure 10:
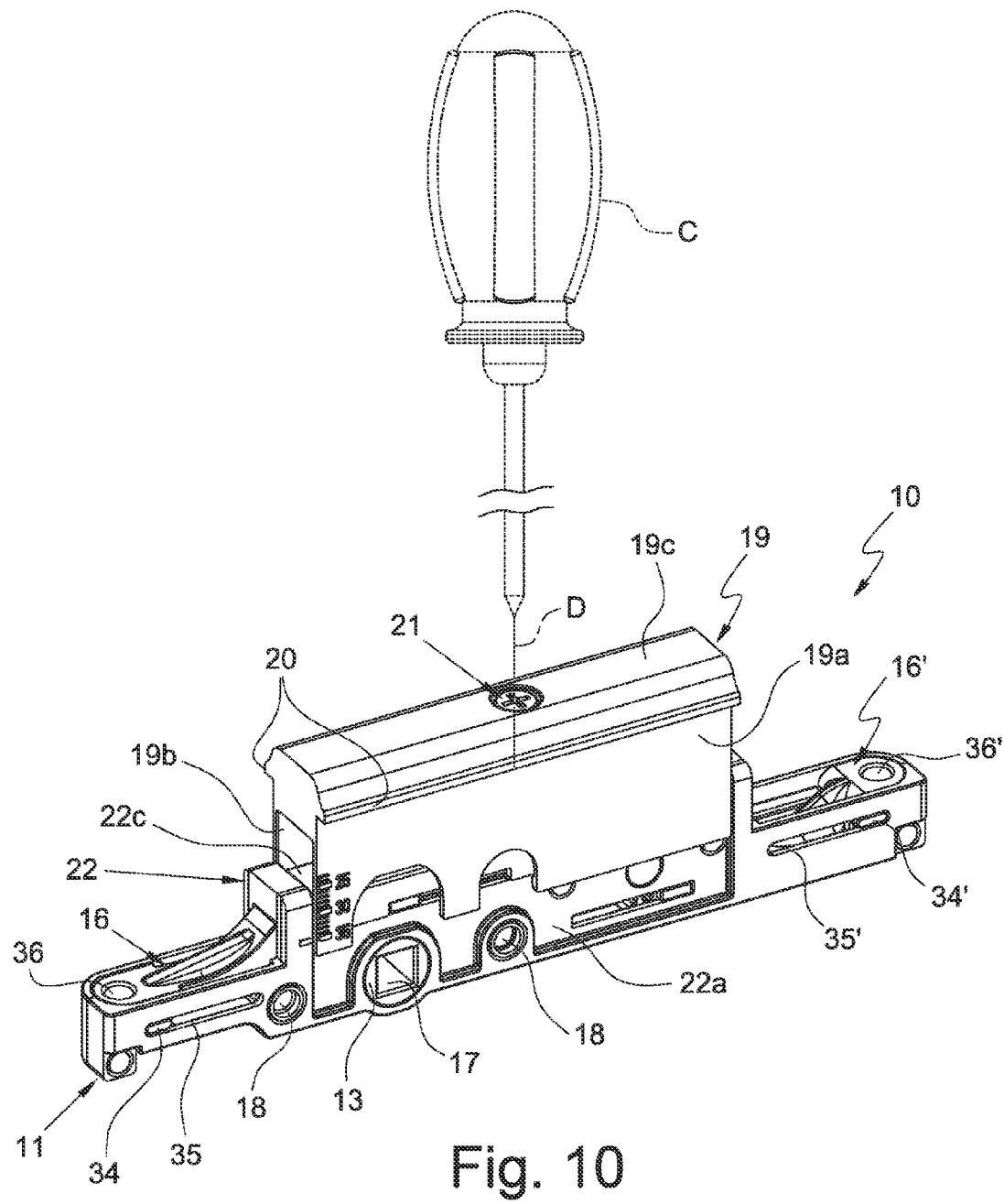
Figure 11:
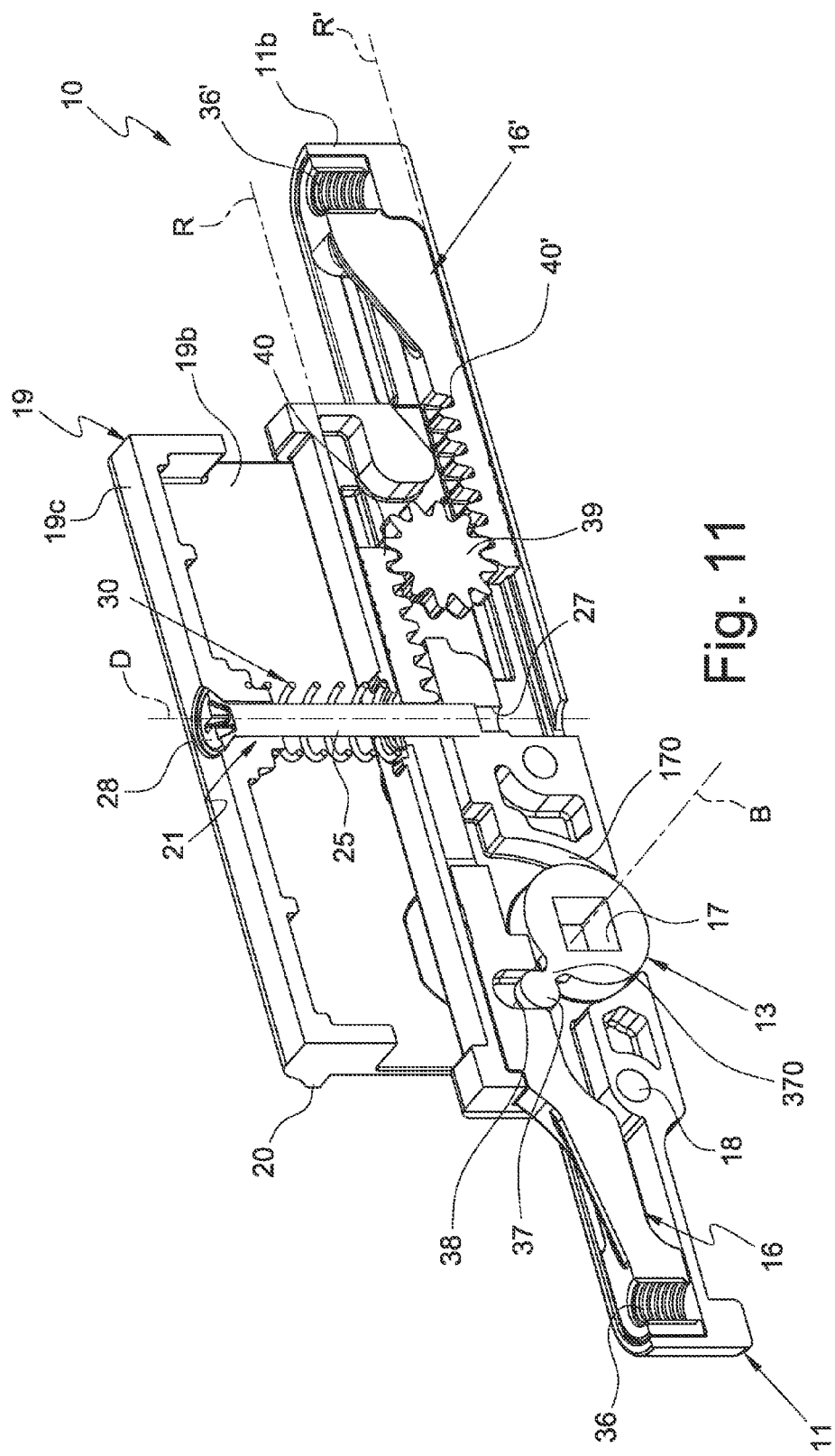
Figure 12:
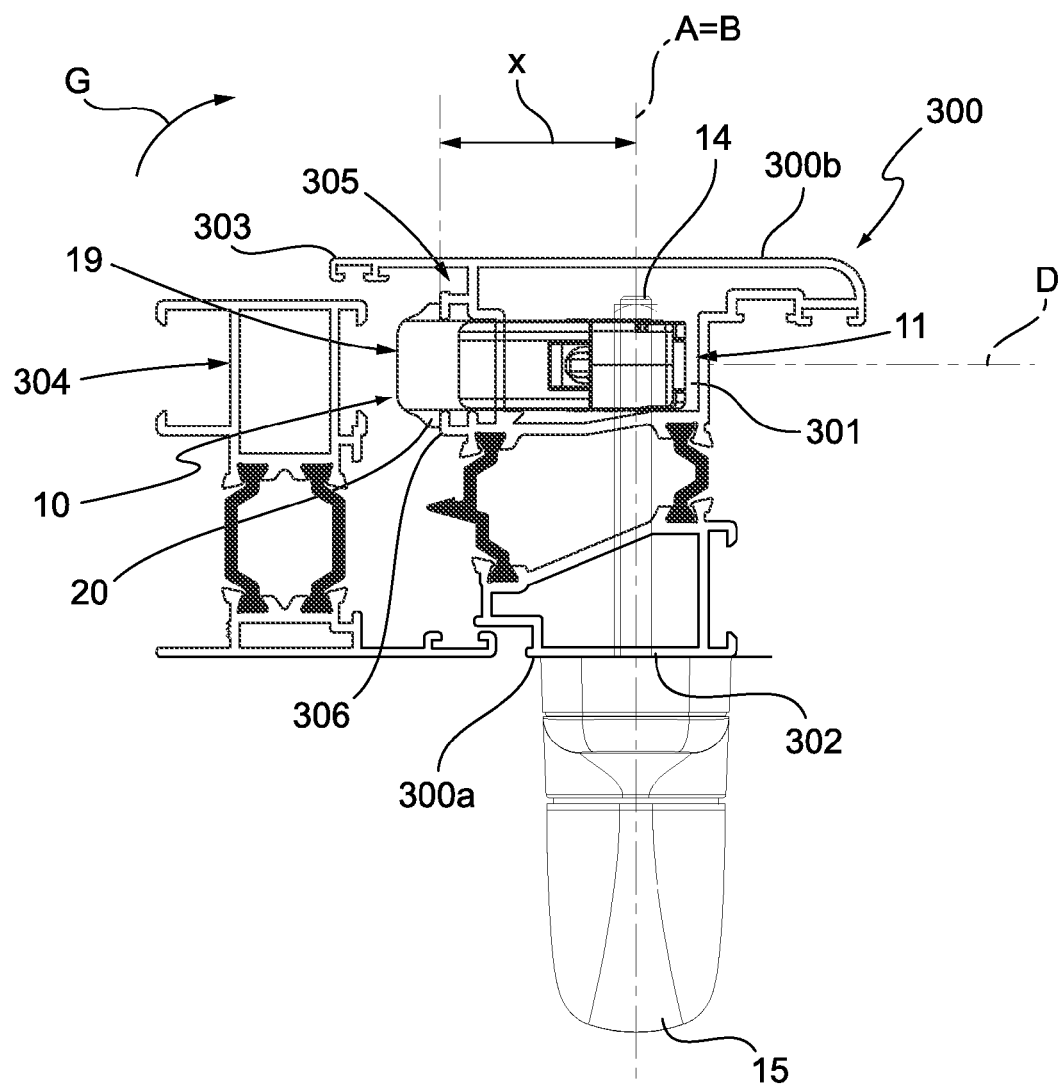
FIG. 12 is a schematic cross section view of a profile that forms the side of an external opening window or door frame movable swing with the moving device of FIG. 9 applied and in an abutment position on the profile that forms the corresponding side of the fixed frame or of the other swing of the window or door frame.
Figure 13:
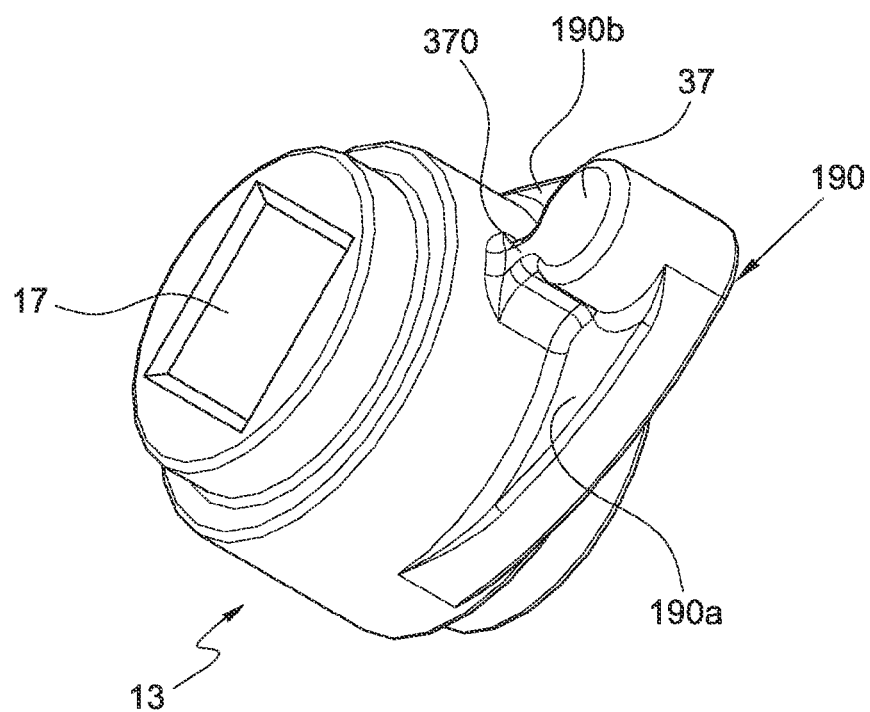
FIGS. 13 and 14 are axonometric views of a preferred embodiment of the rotary element of the moving device according to the present invention.
Figure 14:
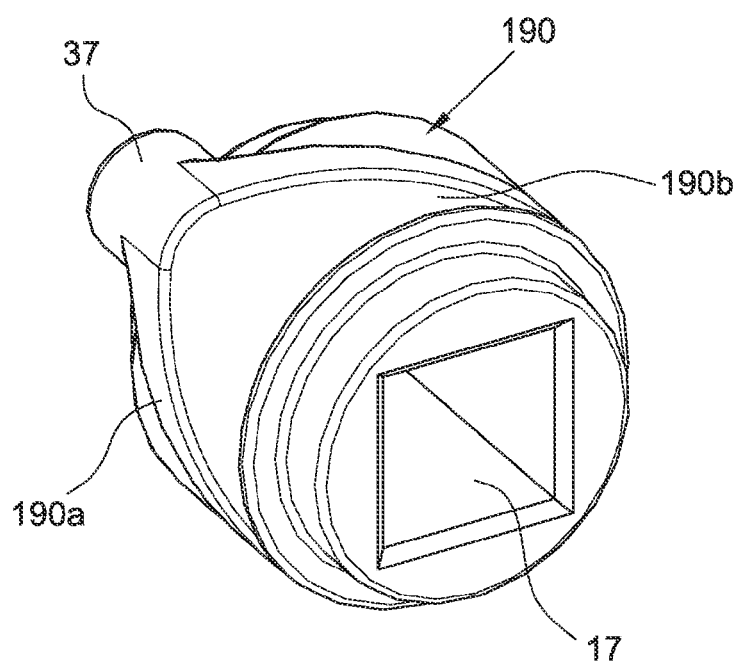

The different configuration of the profile 100, 200, 300 and the different arrangement of the wing 103, 203, 303 are a function of the opening mode of the window or door frame:

"inwards", i.e. towards the room in which the lever or handle 15 is housed, as shown in FIGS. 5 and 6, or "outwards", i.e. towards the area opposite that in which the lever or handle 15 is housed, as shown in FIGS. 7, 8 and 12, where the opening senses have been indicated by the arrows F and G.

The profile 100, 200, 300 also has a part 105, 205, 305 that defines the outer edge of the corresponding side of the movable swing and that, when the window or door frame is closed, faces a corresponding part of the profile 104, 204, 304 of the respective fixed frame or of the respective other window or door frame swing.

The maximum distance X between the axis A of the hole 102, 202, 302 intended to receive the pin 14 of the lever or handle 15 and the part 105, 205, 305 taken on the plane orthogonal to the plane P of the movable swing and parallel to the axis A itself is defined in the jargon as "entry" of the pin 14 and it can vary as a function of the type of profile 100, 200, 300 for "inward" or "outward" opening.

As it is clear from the attached FIGS. 5, 6, 7, 8 and 12, during the mounting step it is necessary to align and centre the seat 17 of the element 13 and the holes 18 of the supporting and containing body 11 with the respective holes 102, 202, 302 obtained in the profile 100, 200, 300 so as to be able to ensure the coupling with them, respectively, of the pin 14 and of the threaded fixing elements.

According to the present invention, the moving device 10 comprises an auxiliary body 19 that is mounted on the supporting and containing body 11 in a mutually movable manner along a direction D parallel to the distance X. The auxiliary body 19 is provided with at least one abutment element 20 with a reference plane 106, 206, 306 that is defined in the respective profile 100, 200, 300 and that is adapted to serve as reference for the positioning of the supporting and containing body 11 in the seat 101, 201, 301 along such a direction D.

The moving device 10 also comprises adjustment means 21 for the adjustment of the relative position of the auxiliary body 19 and of the supporting and containing body 11 along the direction D.

When the moving device 10 is in the mounted configuration on the profile 100, 200, 300 constituting a side of the movable wing of the window or door frame, the direction D is parallel to the side of the frame of the swing, i.e. to the plane P defined by the movable swing, and orthogonal to the direction of the translational motion of the at least one slider 16, i.e. to the line R. Therefore, it is parallel to the distance X.

In greater detail, between the auxiliary body 19 and the supporting and containing body 11 rectilinear guiding means for the mutual displacement of one respect to the other along the direction D are defined.

In practice, the auxiliary body 19 and the supporting and containing body 11 are connected to each other to form a prismatic pair that allows the relative translation of one with respect to the other along the direction D, preventing the rotation thereof about such a direction D.

With reference to the embodiment represented in the attached figures, the auxiliary body 19, seen in cross section according to a plane parallel to the direction D and orthogonal to the line R, has a C-shaped, U-shaped, U bolt-shaped section or alike and is mounted on a corresponding prismatic portion of the supporting and containing body 11.

In greater detail, the supporting and containing body 11 has a substantially rectangular-parallelepiped-shaped portion 22 that has a first face 22a and a second face 22b, which are opposite each other and orthogonal to the rotation axis B defined by the element 13, and a third face 22c, which, when the moving device 10 is in the mounted configuration on the profile 100, 200, 300, faces towards the external part 105, 205, 305 thereof.

Correspondingly, the auxiliary body 19 has two walls 19a, 19b that are parallel to each other and spaced apart and joined along a respective side by a back 19c.

The auxiliary body 19 is mounted on the portion 22 of the supporting and containing body 11 with the two walls 19a, 19b slidably guided along the direction D respectively on the first face 22a and on the second face 22b and with the back 19c arranged with its inner surface facing the third face 22c.

Between the auxiliary body 19 and the supporting and containing body 11 holding means suitable for preventing the detachment of the former from the latter at least along the direction D are defined. In the embodiment represented in the attached figures, such holding means comprise tongues 23 projecting from the mutually facing surfaces of the two walls 19a, 19b, which tongues, once the maximum possible spacing apart stroke has been reached between the auxiliary body 19 and the supporting and containing body 11, go into abutment against respective stop surfaces 24 defined by a projection hanging from the faces 22a, 22b of the portion 22 of the supporting and containing body 11.

As it will become clearer hereafter, by modifying the thickness of the back 19c it is possible to modify the overall height of the auxiliary body 19 and, therefore, for the same useful stroke between the auxiliary body 19 and the supporting and containing body 11 along the direction D, the range of values within which the distance X is adjustable.

The at least one abutment element 20 defines a plane surface projecting from the auxiliary body 19 and that, when the moving device 10 is in the mounted configuration on the profile 100, 200, 300, extends along a plane orthogonal to such a side, i.e. orthogonal to the plane P defined by the movable swing itself, and parallel to the direction of the translational motion of the at least one slider 16 (line R). In practice, such a plane surface is parallel both to the line R and to the rotation axis B of the element 13.

The corresponding reference plane 106, 206, 306 defined in the respective profile 100, 200, 300 is plane, orthogonal to the side of the frame defined by the profile itself, i.e. it is orthogonal to the plane P defined by the movable swing itself, and parallel to the longitudinal development of the profile itself and, therefore, to the direction of the translational motion of the at least one slider 16 (line R).

Such a reference plane 106, 206, 306 is obtained at the external part 105, 205, 305 of the profile 100, 200, 300 and defines the surface with respect to which the maximum distance X is measured and which acts as reference for the positioning of the supporting and containing body 11.

In the embodiment represented in the attached figures, the at least one abutment element 20 is defined by a pair of projections hanging from the external surface of the auxiliary body 19 at the opposite sides of the back 19c or of the two walls 19a, 19b thereof.

The adjustment means 21 for adjusting the relative distance between the auxiliary body 19 and the supporting and containing body 11 are configured so that, when the moving device 10 is in the mounted configuration on the profile 100, 200, 300, they are accessible from the outside of the frame itself.

Such adjustment means 21 can be of the threaded type and can comprise at least one stem 25 that is at least partially threaded, extends parallel to the direction D, is inserted with clearance in a through-hole 26 obtained in the auxiliary body 19 and engages with its thread in a threaded hole 27 obtained in the supporting and containing body 11.

The stem 25 has an operating head 28 that is encased in a respective containment seat 29 obtained in the auxiliary body 19; the head 28 is engageable by an operating tool such as a screwdriver C.

Figure 4:
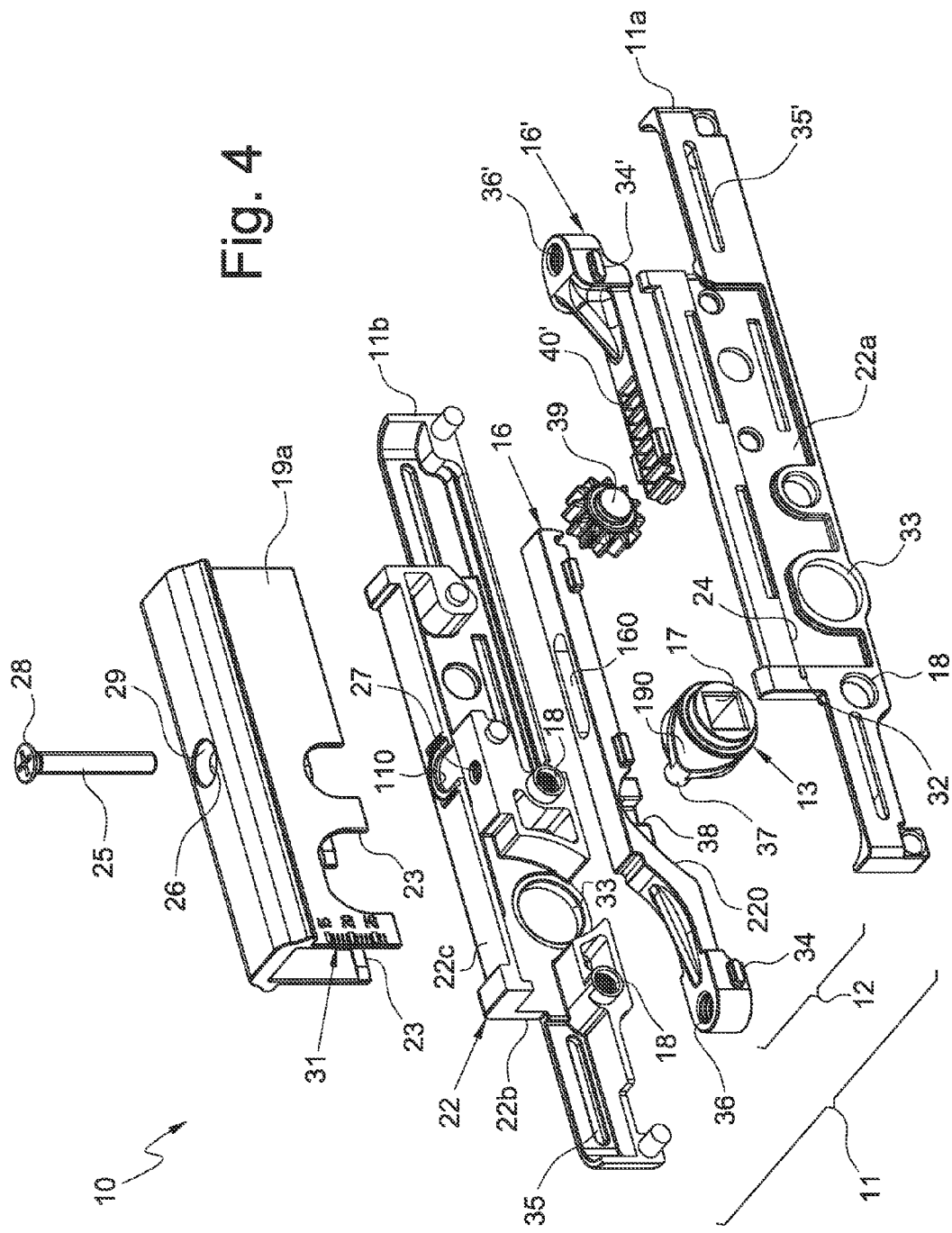
FIG. 4 is a schematic exploded view of the moving device of FIG. 1.

As it can be seen from FIG. 4, the slider 16 has a slot 160 through which the stem 25 passes, just as the supporting and containing body 11 has, at the portion 22, a slot 110 through which the stem 25 passes.

In a possible embodiment, between the auxiliary body 19 and the supporting and containing body 11 it is possible to interpose elastic means 30 of the type for instance of a spring coaxial to the stem 25 itself and the opposite ends of which rest on a corresponding seat obtained respectively in the supporting and containing body 11 and in the auxiliary body 19.

Advantageously, displaying means are provided for displaying the relative position of the auxiliary body 19 and of the supporting and containing body 11 along the direction D and, therefore, directly or indirectly, the distance X. Such displaying means can comprise a graduated scale 31 obtained in the auxiliary body 19 and a reference index 32 obtained in the supporting and containing body 11 or vice-versa.

The supporting and containing body 11 consists of two shells 11a and 11b coupled to each other for example by interlocking.

As far as the embodiment of the mechanism 12 is concerned, it could be different from that represented in the attached figures, which embodiment, however, is preferred and advantageous for the reasons outlined hereafter. It should also be specified that the embodiment of the mechanism 12 as represented in the attached figures could also be adopted by itself in "macchinette" not incorporating an auxiliary body 19 as defined above.

In general terms, the mechanism 12 comprises an element 13 that is supported by the supporting and containing body 11 in a rotary manner about a rotation axis B. As it can be seen from FIG. 3, the rotary element 13 is rotatably supported in a semi-bushing or cradle 130 obtained in the supporting and containing body 11. The rotary element 13 has a seat 17 coaxial to such a rotation axis B and intended to couple with prismatic coupling with the pin 14 of the control lever and/or handle 15. The seat 17 and the portion of the pin 14 engageable with it have, indeed, a polygonal section and, in particular, right quadrangular; in the jargon, indeed, the pin 14 is often indicated as "square pin" or "square handle". The supporting and containing body 11 has through-holes 33 at the seat 17, so that the latter is accessible from the outside of the supporting and containing body itself.

The rotary motion of the element 13 is transformed into rectilinear motion along the two opposite senses of the same line R, R' of one or two sliders 16, 16' movable in opposite senses. Each of the two sliders 16, 16' is supported by the supporting and containing body 11 by means of respective rectilinear guiding members such as fins 34, 34' slidably guided in corresponding slots 35, 35' and has an end accessible from the outside of the supporting and containing body 11 and at which connection means 36, 36' with a respective operating or closing rod, not depicted, are obtained.

It should be specified that the "rotary motion" of the element 13 occurs in both rotation senses and can be limited to an angle of less than 360° and, in general, less than 90°.

The element 13 has a unique radial arm 370 at the end of which an appendix 37 is formed, said appendix 37 is slidably inserted along a slot 38 which is obtained in a saddle fixed or obtained in the slider 16 and which extends in a direction substantially orthogonal to the sliding direction of the slider 16 itself (line R) and to the rotation axis B of the element 13.

The saddle is fixed to, incorporated in or obtained in one piece in the slider 16, so as to form a unique body with it. The appendix 37 is generally cylindrical and has, on a plane orthogonal to the rotation axis B (parallel to the plane defined by the moveable window or door frame), a cylindrical section which has a transversal dimension d orthogonal to the radial development of the arm 370 that is greater than the transversal dimension of the arm itself, such dimensions being measured in the plane of movement of the arm 370.

Figure 3:
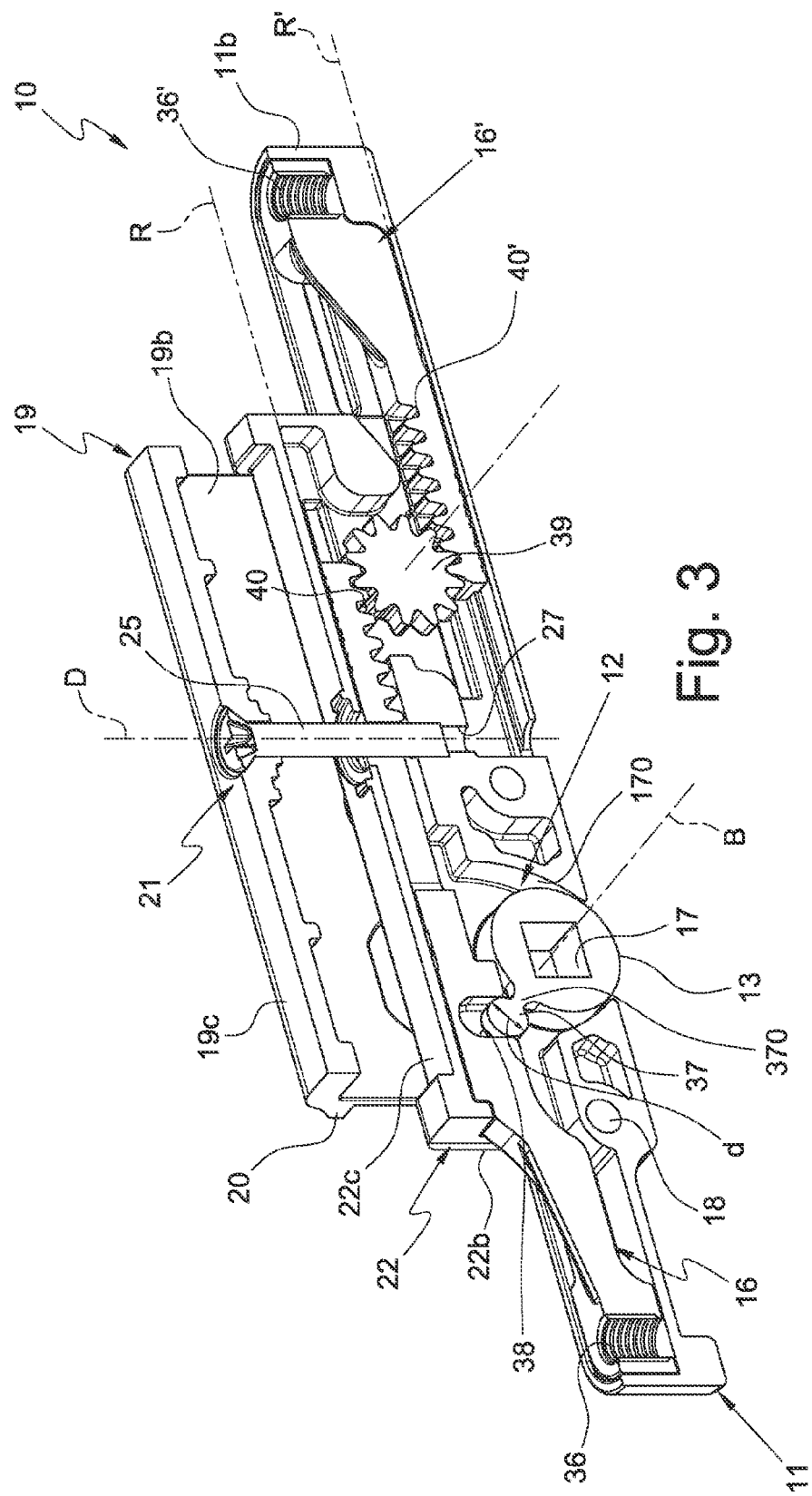
FIG. 3 is an axonometric and sectioned view of the moving device of FIG. 2 taken along line III-III.

As it can be seen from FIG. 3, the transversal dimension of the slot 38, measured on a plane orthogonal to the rotation axis B, is substantially equal to the transversal dimension d of the appendix 37 on such a same plane, apart from tolerances and clearances such as to allow the relative sliding motion of one with respect to the other.

The radial arm 370 and its appendix 37 are obtained projecting from the surface of a shaped stiffening wing 190 that extends from the element 13; as a whole, such a stiffening wing 190 extends on a plane orthogonal to the rotation axis of the element 13 and, on such a plane, has a greater width than that of the radial arm 370 and of the relative appendix 37.

The stiffening wing 190 is shaped so as not to hinder the rotation of the rotary element 13 and the consequent sliding of its appendix 37 along the slot 38. In particular, the stiffening wing 190 lies outside of the slot 38. In the represented embodiment, the wing 190 also forms two ribs 190a and 190b that join the opposite sides of the radial arm 370 and of its appendix 37 to the side surface of the rotary element 13. The outer profile of such two ribs 190a and 190b is arched. The saddle in which the slot 38 is formed, i.e. the slider 16, has a corresponding arched seat 220 that receives the stiffening wing 190.

The rotation of the element 13 activated by the lever or handle 15 is transformed, by means of the appendix 37 slidably coupled along the slot 38, into rectilinear motion of the slider 16.

In the case in which there are two sliders 16, 16' moveable in opposite directions, the mechanism 12 also comprises members for transmitting the translation motion of one to the other and that, in the depicted embodiment, comprise a reel 39 rotatably supported by the supporting and containing body 11 about a rotation axis parallel to the rotation axis B and meshing a pair of racks 40, 40' facing one another and obtained or in any case fixed to the two sliders 16, 16'.

However, alternative embodiments of the mechanism 12 are not excluded in which, for example, the element 13 could consist of a reel meshing two racks facing one another and obtained or in any case fixed to the two sliders 16, 16'.

With reference to FIGS. 9 to 12, they show a device 10 analogous to the one described above with the exception of the size of the auxiliary body 19 that has an overall height greater than the auxiliary body 19 represented in FIGS. 1 to 8. In particular, the greater height is obtained by thickening the back 19c or, in any case, by keeping the maximum relative stroke between the auxiliary body 19 and the supporting and containing body 11 along the direction D unchanged. This allows, for the same useful stroke between the auxiliary body 19 and the supporting and containing body 11, modifying the distance X in a range of values greater than that which can be obtained with the auxiliary body 19 according to FIGS. 1 to 8. This solution has the advantage of being able to limit the height of the threaded hole 27 and/or of preventing the threaded stem 25 from projecting out from the supporting and containing body 11.

Therefore, also object of the present invention is a kit comprising a device 10 equipped with at least one further auxiliary body 19 of different height.

With particular reference to FIGS. 5 to 8 and 12, the operation of the device 10 according to the present invention is now illustrated.

After having carried out a first rough adjustment of the relative position between the auxiliary body 19 and the supporting and containing body 11 as a function of the distance X between the axes of the holes 102, 202, 302 obtained in the profile 100, 200, 300 and the respective part 105, 205, 305, the device 10 is inserted in the seat 101, 201, 301 of the profile itself so that the abutment element 20 rests on the respective reference plane 106, 206, 306 and the back 19c of the auxiliary body 19 projects or is in any case accessible from the outside of the part 105, 205, 305 of the profile itself.

By acting with a screwdriver C on the threaded stem 25 it is possible to change the position of the supporting and containing body 11 with respect to the auxiliary body 19, which acts as fixed reference. It is thus possible to align the holes 18 and 33 of the supporting and containing body 11 with the holes 102, 202, 302 already obtained in the profile.

If it is necessary to use a different profile 100, 200, 300 or if, for the same profile 100, 200, 300 the arrangement of the holes 102, 202, 302 and, in particular, the distance X at which the "entry" of the pin 14 is provided changes, it is sufficient to change the relative position between the auxiliary body 19 and the supporting and containing body 11, possibly adopting a further auxiliary body 19 of different height, without the need to also use a different supporting and containing body 11.

The object of the present invention has the advantage, therefore, of being able to use the same device for moving the members for operating or for closing a window or door frame of the type activated by the rotation of the pin of a control lever or handle as the type of profile constituting a side of the window or door frame movable swing itself changes and/or as the position of the axis of the pin of a control lever or handle changes with respect to the external part of such a profile ("entry" or "inlet").

The object of the present invention, therefore, permits to simplify and, in the broadest sense, to standardise the design and construction of the accessories that equip the mechanisms for operating and for closing a window or door frame, providing a device for moving the members for operating or for closing a window or door frame of the type activated by the rotation of the pin of a control lever or handle that is "universal", adaptable to the different types of profiles and to the different mounting requirements thereupon of the control levers or handles.

The object of the present invention also has the advantage of allowing recovering possible errors in making the holes obtained in the profiles themselves for the passage through them of both the pin of a control lever or handle and of the fixing members of the moving device itself.

The object of the present invention also has the advantage of being able to best exploit the space inside the supporting and containing body in which to be able to house the rotary element and, in particular, to be able to increase the dimensions of the portion of such a rotary element (the end of the radial arm) involved in the transmission and transformation of the rotary motion into alternate rectilinear motion of the slider(s).

It is thus possible to make transmission mechanisms that are stronger and less subject to breaking and such as to ensure a more regular and fluid transmission of motion with respect to known mechanisms. In particular, it should be noted that the radial arm of the rotary element and/or the end thereof that is intended to transmit the motion are stiffened and strengthened by stiffening and strengthening elements such as ribs, wings or the similar.

The device for moving members for operating or for closing a window or door frame thus conceived can undergo numerous modifications and variants, all of which are covered by the invention; moreover, all of the details can be replaced by technically equivalent elements. In practice, the materials used, as well as the sizes, can be whatever according to the technical requirements.

The invention claimed is:

1. A moving device for moving members for operating or for closing a window or door frame, said device being activated by rotation of a pin of a control lever or a handle and comprising:

a supporting and containing body for supporting and containing a mechanism for transforming a rotary motion of an element about a rotation axis (B) in translational motion of at least one slider along a translational motion direction (R), wherein said element is adapted for coupling with the pin of the control lever or handle and wherein said supporting and containing body is adapted for being housed in a seat of a profile forming a side of the window or door frame and wherein said at least one slider is adapted for coupling with a respective rod for operating or closing said window or door frame, an auxiliary body, which includes a longitudinal axis, is mounted on said supporting and containing body in a movable manner one with respect to the other along a movement direction (D), which, when said moving device is in a mounted configuration on said profile, said auxiliary body longitudinal axis is parallel to the side of the window or door frame and to the translational motion direction (R) of said at least one slider, and said direction (D) is orthogonal to both said auxiliary body longitudinal axis and to said rotation axis (B), wherein said auxiliary body is provided with at least one abutment element that is adapted to be non-moveably fixed to the profile for positioning of said supporting and containing body in said seat along the movement direction (D) of said auxiliary body with respect to said supporting and containing body, and adjustment device for adjusting the position of said auxiliary body with respect to said supporting and containing body along the movement direction (D) of said auxiliary body with respect to said supporting and containing body, and wherein said adjustment device comprise at least one stem that has a threaded portion, extends parallel to said movement direction (D) of said auxiliary body with respect to said supporting and containing body and is inserted in a through-hole obtained in said auxiliary body, a clearance being present between said through-hole and said stem inserted in said through-hole, said threaded portion of said stem engaging in a threaded hole obtained in said supporting and containing body, and wherein a spring is interposed between said auxiliary body and said supporting and containing body, said spring is mounted in a coaxial manner on said stem and that has opposite ends resting on a corresponding seat obtained respectively in the auxiliary body and in the supporting and containing body.

2. Moving device according to claim 1, wherein said auxiliary body and said supporting and containing body are connected to each other to form a prismatic pair that allows the movement of said auxiliary body with respect to said supporting and containing body, along said movement direction (D) of said auxiliary body with respect to said supporting and containing body, and that prevents the rotation of said auxiliary body and of said supporting and containing body about said movement direction (D) of said auxiliary body with respect to said supporting and containing body.

3. Moving device according to claim 1, wherein said at least one abutment element defines a plane surface projecting from said auxiliary body and which, when said moving device is in the mounted configuration on said profile, extends along a plane orthogonal to said window or door frame side and parallel to said translational motion direction (R) of said at least one slider.

4. Moving device according to claim 1, wherein said auxiliary body, has a substantially C-shaped, U-shaped or U bolt-shaped section or alike and is mounted and guided on a corresponding portion of said supporting and containing body.

5. Moving device according to claim 1, wherein said supporting and containing body has a substantially rectangular-parallelepiped-shaped portion having a first face and a second face which are opposite one another and orthogonal with respect to the rotation axis (B) defined by said element that is adapted for coupling with said pin of said control lever or handle and a third face which, when said moving device is in the mounted configuration on said profile, faces a part of said profile which defines an outer edge of said window or door frame side, said outer edge facing a corresponding part of a profile of a respective fixed window or door frame or of a respective other window or door frame, and in that said auxiliary body has two walls parallel one to the other and spaced apart and joined together along a respective side through a back having an inner surface facing towards said two walls of the auxiliary body, wherein said auxiliary body is mounted on said supporting and containing body with said two walls guided along said movement direction (D) of said auxiliary body with respect to said supporting and containing body and respectively on said first face and said second face and with said back arranged to have an inner surface facing said third face.

6. Moving device according to claim 5, wherein said at least one abutment element is defined by at least one projection projecting from an external surface of said back or of at least one of said two walls.

7. Moving device according to claim 1, wherein, when said moving device is in the mounted configuration on said profile, at least said adjustment device is accessible from outside of said profile.

8. Moving device according to claim 5, further comprising holding device for holding said auxiliary body on said supporting and containing body suitable for preventing a detachment of said auxiliary body from said supporting and containing body at least along said movement direction (D) of said auxiliary body with respect to said supporting and containing body and said a holding device comprising tongues projecting from mutually facing surfaces of the two walls of said auxiliary body, which tongues, once a maximum spacing apart stroke between the auxiliary body and the supporting and containing body has been reached, abut against respective stop surfaces projecting from the first face and the second face of said rectangular-parallelepiped-shaped portion of said the supporting and containing body.

9. Moving device according to claim 1, further comprising displaying device for displaying the position of said auxiliary body with respect to said supporting and containing body along said movement direction (D) of said auxiliary body with respect to said supporting and containing body and said a displaying device comprising a graduated scale obtained in the auxiliary body and reference index obtained in the supporting and containing body.

10. Moving device according to claim 1, wherein said mechanism for transforming comprises a radial arm which is fixed or obtained in said element adapted for coupling with the pin of said control lever or handle, said radial arm having an end that is equipped with an appendix that is housed in a sliding manner along a slot obtained in a saddle supported by said supporting and containing body in a sliding manner along the translational motion direction (R) of said at least one slider wherein said saddle is fixed to or in said at least one slider and wherein said slot extends in a direction substantially orthogonal to said translational motion direction (R) of said at least one slider and to the rotation axis (B) of said element being coupled with the pin of said control lever or handle.

11. Moving device according to claim 1, further comprising an additional slider that is supported by said supporting and containing body in a movable manner with translational motion along a second line (R') parallel to the translational motion direction (R) of said at least one slider, said additional slider being adapted for coupling with a respective rod for operating or closing said window or door frame, wherein members are provided for transmitting the translational motion of said at least one slider to said additional slider, which members are associated with said supporting and containing body and which comprise a pair of racks that are coupled with said at least one slider and with said additional slider, wherein said racks are arranged parallel to the direction of movement of said sliders and face each other and mesh with a common reel mounted on said supporting and containing body in a rotary manner about a respective axis parallel to the rotation axis (B) of said element being coupled with the pin of said control lever or handle.

12. Moving device according to claim 10, further comprising an additional slider that is supported by said supporting and containing body in a movable manner with translational motion along a second line (R') parallel to the translational motion direction (R) of said at least one slider, said additional slider being adapted for coupling with a respective rod for operating or closing said window or door frame, wherein members are provided for transmitting the translational motion of said at least one slider to said additional slider, which members are associated with said supporting and containing body and which comprise a pair of racks that are coupled with said at least one slider and with said additional slider, wherein said racks are arranged parallel to the direction of movement of said sliders and face each other and mesh with a common reel mounted on said supporting and containing body in a rotary manner about a respective axis parallel to the rotation axis (B) of said element being coupled with said control lever or handle.

13. A kit for closing the window or door frame comprising the moving device according to claim 1 and at least one additional said auxiliary body replaceable to said at least one auxiliary body, wherein said at least one auxiliary body and said at least one additional auxiliary body have different height taken along said movement direction of said auxiliary body with respect to said supporting and containing body.

* * * * *